3,280,174
MIXTURES OF DIHALO-o-TOLYLACETIC ACIDS
AND DERIVATIVES
Edward D. Weil, Lewiston, Jerome Linder, Niagara Falls, and Edwin Dorfman, Grand Island, N.Y., assignors to Hooker Chemical Corporation, Niagara Falls, N.Y., a corporation of New York
No Drawing. Filed May 15, 1961, Ser. No. 109,879
4 Claims. (Cl. 260—476)

This invention describes a novel class of herbicides derived from o-xylene. More specifically, this invention relates to dihalo-ortho-tolylacetic acids and their derivatives, useful as organic intermediates, herbicides and as intermedites for preparing other herbicides and pesticides. The compositions of this invention are of the structure:

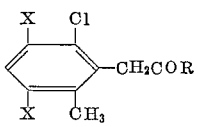

wherein R is an organic radical selected from the group consisting of hydroxy, alkoxy, substituted alkoxy, substituted aryloxy, amino, substituted amino and halogen, and X is a member of the group consisting of hydrogen and halogen with the proviso that one X be hydrogen. Where R is hydroxy, the corresponding salts are also included.

Examples of the compounds of this invention include but are not limited to the methyl, ethyl, propyl, isopropyl, butyl, isobutyl, amyl, isoamyl, hexyl, isohexyl, heptyl, isoheptyl, octyl, nonyl, 2-chloroethyl, methoxyethyl ethoxyethyl, butoxyethyl, methoxypropyl, ethoxyethoxyethyl, butoxyethoxyethyl, butoxyethoxypropyl, other alkoxy alkyls, furfuryl, tetrahydrofurfuryl, phenyl, xylyl, tolyl esters, the mono- and di-methyl, ethyl, propyl, isopropyl, butyl, amyl, hexyl, heptyl, octyl, nonyl, decyl and stearyl amides as well as the simple unsubstituted amides, the piperidide and morpholide, acid halides, the sodium potassium, lithium, ammonium, monoalkylammonium, dialkylammonium, and trialkylammonium salts of 3,6- and 5,6-dichloro-ortho-tolylacetic acids. The salts are in general considered herbicidal equivalents to the acid; although the above named salts are preferred because of water solubility and low cost.

While all of the compounds of this invention are herbicidal to a useful degree, as in any large group of compounds, it is not unexpected to find a smaller group or class within this large group of compounds which are superior as herbicides to the rest of the genus. This superiority is one of degree, not of kind, and is imparted by special characteristics more pronounced in some compounds than in others. Thus, the applicants have found that a narrower group of superior compounds, constituting the preferred embodiment composition-wise would be the 3,6-dichloro-o-tolylacetic acid and its alkali metal, ammonium, and lower alkylammonium salts, its amide and its phenyl ester.

That these novel compositions of matter are herbicidal is most surprising and unexpected in view of the substantial inactivity of closely related compounds. For example, the known monochlorophenylacetic acids are substantially inactive, the trichloro- and tetrachloro-analogs are likewise valueless, and the isomers where the methyl group is meta and para to the carboxyl group are also valueless as herbicides. Thus, it is most unusual to find that the presence of a second chloro group on the ring and the ortho relationship between the methyl group and the carboxyl group is critical in the imparting of herbicidal properties to these compounds. Equally surprising, is the finding that those compositions where one of the two chlorine atoms is para to the carboxyl group (the 4 position), are much inferior as herbicides to those structures where the chlorines are ortho and meta to the acid group. The unsuitability of the 4-chlorinated isomers as herbicides notwithstanding, the 3,4- and 4,5-dichloro-o-tolylacetic acid and derivatives may be present to varying degrees in the reaction mixtures used for herbicidal purposes. Due to tedious and expensive separation procedures required to remove these isomers formed during the chlorination step of the preparative process, for reasons of economic practicality, we prefer to utilize 3,6-dichloro-o-tolyl acetic acid in the form of a crude containing in the range of thirty-five to sixty-five percent 3,6-isomer, the remainder being principally 4,5-, 3,4-, and 5,6-dichloro-o-tolylacetic acids, said mixture arising by the method of preparation described in the first example below.

The novel compositions of this invention offer several major advantages over related compounds in the prior art. For example, these compounds are inexpensive to prepare, are active against a variety of perennial and annual weeds and grasses including bindweed, sorrel, crabgrass, chickweed, and other troublesome species, and are effective in both pre- and post-emergency application. A rather unusual activity that these herbicides possess is high pre-emergence phytotoxicity toward crabgrass in lawn and turf without appreciably damaging the lawn or turf. It is an additional advantage of the novel compositions of this invention that they may be used in various grades of purity ranging from the highly purified crystalline products to technical crudes depending upon the intended application. However, where the compounds are destined to be used as organic intermediates, high purity material is desirable.

Furthermore, when used as herbicides, these compositions offer the advantage of compatability with a host of other herbicides including the tri- and tetrachlorophenylacetic acids and the sodium borates and calcium borates, 2,4-D and other herbicidal phenoxy aliphatic acids and esters, simazine and other herbicidal triazines, monuron, fenuron, diuron and other herbicidal ureas, metal chlorates, petroleum oils, hexachlorocyclopentadiene, pentachlorophenol, dinitro-o-alkylphenols, sodium trichloroacetate, and sodium 2,2-dichloropropionate, with fungicides such as the metal dimethyldithiocarbamates and ethylenebis-(dithiocarbamates), with insecticides such as benzene hexachloride and chlordane, with fertilizers such as urea and ammonium nitrate, and various adjuvants and diluents well known to the art. Thus, these herbicides may be used by themselves or made the subject of liquid or solid formulations ranging from the very simple to the most complex. For example, if desired, these compositions may be made into a liquid formulation by diluting, dispersing, dissolving or emulsifying with a surface active adjuvant or combination of these adjuvants in water or organic solvents such as petroleum hydrocarbons, alcohols, ketones, esters, glycols or combinations thereof. The use of water as solvent is particularly practicable with the soluble sodium, potassium, lithium, ammonium, mono-, di-, and trimethylammonium, mono-, di-, and triethylammonium, mono-, di-, and tri-(2-hydroxyethyl)ammonium and other lower alkylammonium salts of the acids of the invention. Or alternatively, the novel herbicides may be made up as solid formulations of powders, dusts, wettable dusts, granules and pellets using solid diluents such as talcs, clays, flours, starches, diatomaceous earths, mica, alkaline earth limes, carbonates and phosphates either finely divided, granular or pelleted in form.

These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–5, and No. 10, pages 38 (67), 1955. Other sources of adjuvant materials is set forth in Bulletin E–607 of the Bureau of Entomology and Plant Quarantine of the United States Department of Agriculture.

While the manner and method of application of the inventive compositions is varied and largely dependent upon the climatic conditions, crop treated, the weeds to be eradicated, the equipment available and the convenience of the user, a preferred embodiment of this invention is to apply these herbicides as a spray after making them up as a liquid formulation, which is dispersed in water and sprayed on the weed-infested area. Or alternatively, these compositions may be applied as a solid formulation directly to the ground in the weed-infested area.

The rate of application cannot be precisely stated due to varying degree of resistance possessed by the weed species and crop, the stage of weed and crop growth, the soil type and climatic conditions, but in general, the rates will be at least one-quarter of a pound of herbicide per acre with the preferred range falling within one-half to fifty pounds per acre. Where the weeds are in an early stage of growth, being more susceptible, they will frequently respond to the rates from one-half to four pounds per acre while older weeds or weeds that are to be totally eradicated from ornamental beds or turf may require rates in excess of four pounds per acre. In those instances where the weed population has been allowed to accumulate unchecked, or where mature plants are encountered, applications of up to fifty and even beyond this rate may be required. For eradication of deeply-rooted herbicide-resistant perennial weeds such as field bindweed, rates of ten to one hundred pounds are found best.

The compounds of the invention may also be used at sub-lethal rates as plant growth regulators, for example, to stunt the growth of trees under power lines, as chemotherapeutant growth retardants, versus Dutch elm disease and other vascular diseases, and other uses where it is intended to retard plant growth without killing.

The following examples are intended to illustrate the workings of this invention including such facets as the preparation of the herbicidal compositions, their formulation as herbicidal agents, and the testing results obtained using them.

The novel compositions of this invention are prepared in good yield from o-xylene, or commercial mixed xylenes containing a substantial portion of the ortho isomer, by introduction of chlorine gas at preferably zero to one hundred degrees centigrade in the presence of a few parts per million up to several percent of a Lewis acid catalyst such as ferric chloride, antimony chloride, titanium chloride, or the like, until two chlorine atoms are substituted for hydrogen in the aromatic ring. Alternative chlorinating agents such as sulfuryl chloride may be used. The dichloro-o-xylene isomers may then be partially or totally separated by fractional distillation and crystallization such as described by Boyars, J. Am. Chem. Soc., 75, 1989 (1953), or the mixture used without separation. The latter course is economically advantageous. In any case, the dichloro-o-xylene is preferably separated from the catalyst and from lower and higher chlorinated xylenes by distillation. The dichlorinated o-xylene isomer or mixture is then chlorinated in the side-chain to introduce one chlorine substituent in one of the methyl groups. This is generally done by introducing chlorine gas at fifty to two hundred degrees centigrade in the absence of a Lewis acid catalyst and preferably under the influence of actinic light. It is advantageous to chlorinate to less than one hundred percent conversion to avoid troublesome over-chlorinated by-products. The dichloro-o-xylyl chloride is then treated with a solution of an alkali metal cyanide, preferably in aqueous ethanol or methanol at or near reflux, to obtain a dichloro-o-tolylacetonitrile, which is isolated by stripping off the solvent, and then hydrolyzed by heating with an aqueous acid such as sixty-five percent sulfuric acid, to form the dichloro-o-tolylacetic acid or with an aqueous base such as aqueous caustic soda to form a salt of the dichloro-o-tolylacetic acid. Or, the hydrolysis can be stopped at the amide stage by use of a more limited amount of water and the amide isolated. The acid chlorides, N-substituted amides, esters and salts are formed through reactions well established in organic chemistry. At any stage of the process following the initial chlorination of the aromatic ring, where desired the more desirable 3,6- and 5,6-dichloro isomers can be separated by fractional distillation, crystallization or other means. In the additional examples which follow the invention is further illustrated. Except as set forth in the specification and the claims, the examples are not to be construed in any manner or form as limiting the examples.

*Example 1.—Preparation of dichloro-ortho-tolylacetic acid*

Three hundred and eighteen parts of o-xylene and one part of ferric chloride was chlorinated by gaseous chlorine at fifty-five degrees until one hundred and seventy-five parts of hydrogen chloride was evolved, the crude product was washed with water and fractionated to isolate the dichloro-o-xylene fraction (two hundred and fifty-eight parts), boiling at ninety to one hundred degrees (nine mm.). Analysis by infrared shows the mixture to contain roughly forty to sixty percent 3,6-isomer, the rest being mostly 4,5- with a lesser amount of 3,4-. This fraction was chlorinated by gaseous chlorine at one hundred and ten to one hundred and thirty degrees under illumination by a mercury vapor lamp until approximately 0.6 to 0.8 molar equivalent of hydrogen chloride was evolved. The product was then refluxed for six hours with one hundred parts of sodium cyanide in one hundred parts of water and three hundred parts of methanol. The reaction mixture was then stripped of solvent, washed with water to remove salts, and fractionated to isolate the dichloro-o-tolylacetonitrile as a cut boiling at one hundred and two to one hundred and fifty degrees (four mm.).

*Analysis.*—Calcd. for $C_9H_7Cl_2N$: Cl, 35.5 percent. Found: Cl, 34.8 percent.

The nitrile was hydrolyzed by refluxing for one and one-half hour with a two-fold weight of sixty-five percent sulfuric acid, the aqueous acid then diluted with water and decanted. The product was washed with water and dried in vacuum to obtain crude dichloro-o-tolylacetic acid in ninety to ninety-five percent yield as a tan amorphous solid. Based on the isomer distribution of the initial dichloro-o-xylene, the technical product comprised approximately forty to sixty percent 3,6-dichloro-isomer the remainder being mostly 4,5- with lesser amounts of 3,4- and 5,6-dichloro-isomers.

*Analysis.*—Calcd. for $C_9H_8O_2Cl_2$: Neutralization equivalent, 219. Found: Neutralization equivalent, 218.

Another portion of dichloro-o-tolylacetonitrile was dissolved in concentrated sulfuric acid at eighty to one hundred and twenty degrees and the resultant solution poured into water, thereby precipitating dichloro-o-tolylacetamide in essentially quantitative yield, as a tan amorphous solid.

*Analysis.*—Calcd. for $C_9H_9Cl_2NO$: Cl, 32.6 percent. Found: Cl, 33.1 percent.

*Example 2*

Using the method of Boyars (loc. cit.), dichloro-o-xylene was resolved into 4,5-dichloro-o-xylene and 3,6- dichloro-o-xylene. Each of these isomers was separately converted to the corresponding isomer of dichloro-o-tolylacetic acid and amide by the procedure of the foregoing example, and in each case the product was established as having the correct chlorine analysis, and, in the case of the acids, a neutralization equivalent in the range of two hundred and nineteen to two hundred and twenty-one.

The physical constants and analytical data for these new compounds are as follows:

|  | M.P., °C. | Neutral Equiv. | | Percent Chlorine | |
|---|---|---|---|---|---|
|  |  | Calcd. | Found | Calcd. | Found |
| 3,6-dichloro-o-tolylacetic acid | 141 | 219 | 220 | 32.4 | 32.2 |
| 3,6-dichloro-o-tolylacetamide | 176 |  |  | 32.5 | 32.2 |
| 4,5-dichloro-o-tolylacetic acid |  | 219 | 219 | 32.4 | 32.5 |
| 4,5-dichloro-o-tolylacetamide | 161.5 |  |  | 32.5 | 32.3 |

*Example 3*

Dichloro-o-tolylacetic acid made as described in Example 1 was applied at the rate of two pounds per acre to an area which was subsequently seeded with corn, onions, crabgrass, and lamb's-quarters. When inspected one month later, the emergence of the crabgrass and lamb's-quarters was found to be substantially prevented, whereas the corn and onions were healthy and uninjured.

*Example 4*

An isomer mixture of dichloro-o-tolylacetamide, made as in Example 1, was applied pre-emergence at two pounds per acre to an area seeded with chess, foxtail, and mustard. The emergence and growth of these weeds was almost entirely surpressed for one month.

*Example 5*

An aqueous solution of 3,6-dichloro-o-tolylacetic acid as the sodium salt was sprayed at the rate of fifty pounds per acre on an area infested with field bindweed and Johnson grass seedlings, prior to onset of growth in the early spring. Almost one hundred percent control of these weeds was observed through the following summer. Similar results were obtained by use of the trimethylamine salt, the dimethylamine salt and the ammonium salt.

*Example 6*

An emulsifiable concentrate of 3,6-dichloro-o-tolylacetic acid was made by dissolving one part of the acid in five parts of xylene and one part of polyoxyethylene sorbitan laurate emulsifier. At two pounds per acre of the active ingredient, the emergence and growth of pigweed was completely inhibited for a two-week period.

*Example 7*

A granular formulation was made starting with a mixed dichloro-o-tolylacetic acid of about forty to sixty percent 3,6-dichloro-o-tolylacetic acid content, the rest being mainly 4,5- with lesser amounts of 5,6- and 3,4-isomers. The acid was melted at one hundred and twenty to one hundred and forty degrees centigrade and sprayed onto tumbling clay granules of twenty-four to forty-eight mesh size in a heated drum, using nine parts by weight of clay per one part of total acid.

This granular formulation was applied at one hundred pounds total weight per acre in the spring to a bluegrass and fescue turf infested with crabgrass and sorrel. Both of these weeds were substantially one hundred percent controlled through the following summer without turf damage.

*Example 8*

A solution consisting of one hundred and nineteen parts of dichloro-o-tolylacetic acid, as prepared in Example 1, one hundred and nineteen parts of phenol, three hundred parts of commercial xylene and six parts of concentrated sulfuric acid is heated to reflux. After refluxing for sixteen hours, seventeen parts of water azeotroped off. The xylene solution is washed with saturated sodium bicarbonate to remove any unreacted phenol and dichloro-o-tolylacetic acid. The xylene is then evaporated off and the product distilled, at a boiling point of one hundred and seventy to one hundred and eighty degrees centigrade, at 0.75 mm. pressure, from which is obtained crude phenyl dichloro-o-tolylacetate in a fifty percent yield as a colorless semi-solid.

*Analysis.*—Calcd. for $C_{15}H_{12}Cl_2O_2$: Cl, 24.0 percent. Found: Cl, 26.7 percent.

The phenyl esters of 3,6- and 4,5-dichloro-o-tolylacetic acid are similarly prepared starting from the pure acid isomers.

*Example 9*

An area infested with grabgrass, quackgrass seedlings, foxtail, ryegrass, dock, mustard, pigweed, lamb's-quarters and chickweed was sprayed pre-emergence at the rate of eight pounds per acre with the various products of the invention and various related compounds. After one month, the degree of weed control in the treated areas relative to untreated control areas was estimated.

| Compound: | Weed control rating |
|---|---|
| o-Tolylacetic acid | 0 |
| Monochloro-o-tolylacetic acid (from monochlorinated o-xylene analogous to Example 1) | 0–1 |
| Dichloro-o-tolylacetic acid (mixed isomers by method of Example 1) | 8 |
| 3,6-dichloro-o-tolylacetic acid | 10 |
| 3,4-dichloro-o-tolylacetic acid (from 3,4-dichloro-o-xylene, analogous to Example 1) | 0 |
| 4,5-dichloro-o-tolylacetic acid | 0 |
| Dichloro-m-tolylacetic acid (from m-xylene, analogous to Example 1) | 0–1 |
| 4,6-dichloro-m-tolylacetic acid (from pure 4,6-dichloro-m-xylene, analogous to Example 1; M.P. 109–111 (from benzene)) | 0 |
| Phenyl dichloro-o-tolylacetate (mixed isomers) (as in Example 8) | 10 |
| Phenyl 3,6-dichloro-o-tolylacetate | 10 |
| Phenyl 4,5-dichloro-o-tolylacetate | 0 |
| Dichloro-o-tolylacetamide (as in Example 1) | 10 |
| 3,6-dichloro-o-tolylacetamide | 10 |
| 4,5-dichloro-o-tolylacetamide | 0 |
| Dichloro-m-tolylacetamide (from m-xylene, analogous to Example 1) | 0 |

Scale: 0=no effect; 1–4=slight control; 5–7=moderate control; 8–9=good control; 10=one hundred percent control.

We claim:

1. A water soluble mixture of the 3,6-dichloro-o-tolylacetic acid salt and the 4,5-dichloro-o-tolylacetic acid salt as major components accompanied by smaller amounts of other dichloro-o-tolylacetic acid salt isomers, said salt anions being selected from the group consisting of sodium, potassium, lithium, ammonium, and mono-, di- and tri-lower alkylammonium.

2. A mixture of 3,6-dichloro-o-tolylacetic acid and 4,5-dichloro-o-tolylacetic acid as major components accompanied by smaller amounts of other dichloro-o-tolylacetic acid isomers.

3. A mixture of 3,6-dichloro-o-tolylacetamide and 4,5-dichloro-o-tolylacetamide as major components accompanied by smaller amounts of other dichloro-o-tolylacetamide isomers.

4. A mixture of phenyl-3,6-dichloro-o-tolylacetate and phenyl 4,5-dichloro-o-tolylacetate as major components companied by small amounts of other phenyl dichloro-o-tolylacetate isomers.

(References on following page)

References Cited by the Examiner

UNITED STATES PATENTS

| | | | |
|---|---|---|---|
| 2,370,394 | 2/1945 | Cass. | |
| 2,444,905 | 7/1948 | Sexton | 260—515 X |
| 2,695,840 | 11/1954 | Leppla | 260—476 |
| 2,726,947 | 12/1955 | Baumgartner | 71—2.6 |
| 2,817,681 | 12/1957 | Terpstra | 260—515 |
| 2,889,382 | 6/1959 | Wohlers | 260—650 X |
| 2,934,420 | 4/1960 | Cook et al. | 71—2.6 |
| 2,938,053 | 5/1960 | Blake et al. | 260—535 |
| 2,958,705 | 11/1960 | Gordon et al. | 260—476 |
| 2,960,532 | 11/1960 | Gordon et al. | 260—476 |
| 2,977,212 | 3/1961 | Tischler | 260—476 |
| 3,009,806 | 11/1961 | Weil et al. | 260—515 |
| 3,013,057 | 12/1961 | Richter | 260—473 |
| 3,013,058 | 12/1961 | Richter | 260—473 |

FOREIGN PATENTS

| | | |
|---|---|---|
| 1,224,787 | 2/1960 | France. |
| 877,067 | 9/1961 | Great Britain. |

OTHER REFERENCES

Marth et al.: Botanical Gazette, June 1949, pages 632–6.

LORRAINE A. WEINBERGER, *Primary Examiner.*

I. MARCUS, DUVAL McCUTCHEN, *Examiners.*

A. D. ROLLINS, R. E. MASSA, T. L. GALLOWAY,
*Assistant Examiners.*